US011167796B2

United States Patent
Modig et al.

(10) Patent No.: US 11,167,796 B2
(45) Date of Patent: Nov. 9, 2021

(54) METHOD AND SYSTEM FOR PROVIDING A STEERING GUIDANCE TO A DRIVER OF A HOST VEHICLE

(71) Applicant: Volvo Car Corporation, Gothenburg (SE)

(72) Inventors: Christoffer Modig, Gothenburg (SE); Mats Jonasson, Partille (SE); Derong Yang, Vastra Frolunda (SE); Rickard Nilsson, Hisings Karra (SE); David Silva Montemayor, Gothenburg (SE); Andreas Lindberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 266 days.

(21) Appl. No.: 16/515,078

(22) Filed: Jul. 18, 2019

(65) Prior Publication Data

US 2020/0023901 A1   Jan. 23, 2020

(30) Foreign Application Priority Data

Jul. 19, 2018   (EP) .................................... 18184408

(51) Int. Cl.
  B62D 15/02 (2006.01)
  B60W 30/095 (2012.01)
  (Continued)

(52) U.S. Cl.
  CPC ......... B62D 15/0265 (2013.01); B60W 10/20 (2013.01); B60W 30/09 (2013.01); B60W 30/0956 (2013.01); B62D 15/0295 (2013.01)

(58) Field of Classification Search
  CPC .............. B62D 15/025; B62D 15/0255; B62D 15/0265; B62D 15/029; B60W 30/08;
  (Continued)

(56) References Cited

U.S. PATENT DOCUMENTS 6,269,308 B1 * 7/2001 Kodaka ................ G01S 13/931
  701/301
6,393,361 B1 * 5/2002 Yano ........................ B60T 7/14
  340/436

(Continued)

FOREIGN PATENT DOCUMENTS

| DE | 2013216931 A1 | 2/2015 |
| DE | 102013216931 A1 | 2/2015 |
| EP | 1982898 A2 | 10/2008 |

OTHER PUBLICATIONS

Feb. 15, 2019 European Search Report issue on International Application No. EP18184408.

*Primary Examiner* — Thomas G Black
*Assistant Examiner* — Sara J Lewandroski
(74) *Attorney, Agent, or Firm* — Clements Bernard Walker; Christopher L. Bernard

(57) ABSTRACT

A method for assisting a driver of a host vehicle in avoiding a collision, the method including: detecting a target in the vicinity of the vehicle; determining that the host vehicle is travelling on a collision course with the target; detecting a set of road markers on a side of the target; detecting a free space on the side of the road markers opposite the target side of the road markers, and when a collision with the target is predicted to occur within a predetermined time period and no driver initiated steering action for avoiding the collision course has been detected, providing a steering guidance to the driver of the host vehicle including altering of a steering wheel angular orientation for momentarily steering the host vehicle towards the road markers to indicate an evasive steering action to the driver.

13 Claims, 5 Drawing Sheets

(51) Int. Cl.
*B60W 30/09* (2012.01)
*B60W 10/20* (2006.01)

(58) Field of Classification Search
CPC .. B60W 30/085; B60W 30/09; B60W 30/095; B60W 30/0953; B60W 30/0956
See application file for complete search history.

(56) References Cited

U.S. PATENT DOCUMENTS

| | | | | |
|---|---|---|---|---|
| 7,016,783 | B2* | 3/2006 | Hac | B60T 7/22 701/301 |
| 9,229,453 | B1* | 1/2016 | Lee | B60W 30/12 |
| 2007/0225914 | A1* | 9/2007 | Kawazoe | B60W 30/12 701/301 |
| 2007/0233386 | A1* | 10/2007 | Saito | G08G 1/167 701/300 |
| 2010/0222965 | A1* | 9/2010 | Kimura | B60W 30/025 701/41 |
| 2012/0101713 | A1* | 4/2012 | Moshchuk | B60W 40/064 701/301 |
| 2013/0226409 | A1* | 8/2013 | Akiyama | B60T 8/17557 701/41 |
| 2014/0149013 | A1* | 5/2014 | Matsuno | B60T 7/12 701/70 |
| 2015/0302751 | A1* | 10/2015 | Strauss | B60T 7/22 701/41 |
| 2016/0339910 | A1* | 11/2016 | Jonasson | G05D 1/0061 |
| 2017/0029026 | A1* | 2/2017 | Okuda | B62D 15/025 |
| 2017/0334483 | A1* | 11/2017 | Schiebahn | G08G 1/165 |
| 2018/0290657 | A1* | 10/2018 | Ryne | G06K 9/00818 |
| 2018/0345959 | A1* | 12/2018 | Fujii | B60W 30/18163 |
| 2018/0350242 | A1* | 12/2018 | Fujii | B60W 30/12 |
| 2019/0009819 | A1* | 1/2019 | Ishioka | B60W 30/10 |
| 2019/0071099 | A1* | 3/2019 | Nishiguchi | B62D 15/0255 |
| 2019/0270448 | A1* | 9/2019 | Takasao | B60W 10/18 |
| 2020/0023884 | A1* | 1/2020 | Mizoo | B62D 6/00 |
| 2020/0148262 | A1* | 5/2020 | Loos | B62D 15/0265 |

* cited by examiner

METHOD AND SYSTEM FOR PROVIDING A STEERING GUIDANCE TO A DRIVER OF A HOST VEHICLE

CROSS-REFERENCE TO RELATED APPLICATION

The present disclosure claims the benefit of priority of co-pending European Patent Application No. 18184408.5, filed on Jul. 19, 2018, and entitled "METHOD AND SYSTEM FOR PROVIDING A STEERING GUIDANCE TO A DRIVER OF A HOST VEHICLE," the contents of which are incorporated in full by reference herein.

TECHNICAL FIELD

The present disclosure relates to a method for providing a steering guidance to a driver of a host vehicle, and to a steering system for a vehicle.

BACKGROUND

Todays vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle.

More advanced cruise control systems are able to dynamically adapt the speed of the vehicle, for example slowing down for lead vehicles. Furthermore, some advanced driver assist systems are able to autobrake the vehicle under some circumstances if a collision is predicted.

Some vehicles are provided with warning systems for providing a warning to a driver when an impending collision is detected. The driver may then him/herself steer away from the threat, or brake if necessary.

However, in some cases the driver does not respond to a threat of a collision due to the panic that may be experienced. A common reaction is to only brake even if other actions would be more suited for avoiding an accident.

US2017/0334483 discloses to indicate a suggested steering direction to the driver of a vehicle if an impending collision with an object is detected when driving on a highway. The suggested steering direction may be either to the left or to the right of the object and into free lanes on the highway. The indication provided by to the driver is provided as a haptic signal in the steering wheel such that no or insignificant change of the driving direction of the vehicle is caused.

However, under some circumstances and for some drivers a more distinct driving indication may be required.

There is therefore room for improvement with regards to guiding driver's to avoid collisions with for example other vehicles on the road.

SUMMARY

In view of above-mentioned prior art, it is an object of the present disclosure to provide an improved method for providing steering guidance for a host vehicle for avoiding a collision with a target.

According to a first aspect of the disclosure, there is provided a method for assisting a driver of a host vehicle in avoiding a collision with a target, the method including: detecting a target in the vicinity of the vehicle; determining that the host vehicle is travelling on a collision course with the target; detecting a set of road markers on a side of the target; detecting a free space on the side of the roader markers opposite the target side of the road markers, and when a collision with the target is predicted to occur within a predetermined time period and no driver initiated steering action for avoiding the collision course has been detected, providing a steering guidance to the driver of the host vehicle, the steering guidance including altering of a steering wheel angular orientation from a current steering wheel angular orientation for momentarily steering the host vehicle towards the road markers for indicating an evasive steering action to the driver.

The present disclosure is based on the realization that a driver of a vehicle may be inspired by a steering guidance to steer away from a target and thereby avoid a panic brake reaction that many drivers experience in situations where a collision is imminent. The yaw angle of the host vehicle as provided by the steering guidance will assist the driver in understanding where to steer the host vehicle to avoid collision with the target and to drive the vehicle into a free space. It is further realized that in a near collision situation in which the driver may experience a high stress, or suffer from fatigue or be distracted, the driver may need a steering guidance which provides a clear directional indication of where to go in order to be able to manually steer the vehicle to a safe free space.

Accordingly, with the inventive concept, the probability of avoiding a collision increases and therefore also provides improved safety for occupants of the host vehicle.

The vicinity of the vehicle may generally be understood to be ahead of or in front of the host vehicle. In other words, the collision course may be understood to lead to a rear-end collision with the target.

The road markers may be any type of marker that indicates the outer edge of the road itself, or that indicate the lanes of the road. In other words, lane markers are one possible type of road markers.

The side of the roader marker opposite the target side may include the opposite lane of the road. Furthermore, it may also include a road shoulder, or an emergency stopping lane, bicycle lane, or any other type of drivable road area for the host vehicle.

To momentarily steer the host vehicle towards the road markers should be interpreted as that the steering guidance is only maintained for a short time period to thereby inspire the driver to manually steer the host vehicle in such a way to avoid the collision with the target.

For instance, the steering guidance provides an altered steering wheel angle sufficient for steering the host vehicle towards a lane marker in the free space to initially assist the driver in manually driving the vehicle towards the free space.

It should be understood that the steering guidance provides an indication to the driver via the steering wheel as well as controlling a steering system to steer the vehicle towards the road markers. As soon as the driver takes control of the steering of the vehicle, the steering guidance is withdrawn. Accordingly, the steering guidance may be overridable by the driver of the host vehicle by providing input via the steering wheel.

In embodiments, the method may include determining a lateral displacement required for the host vehicle to avoid a collision with the target, and estimating a feasible lateral displacement for the host vehicle under present conditions before the impending collision occurs, wherein when the feasible lateral displacement exceeds the required lateral displacement, providing the steering guidance. It is advantageous to first estimate whether the collision can be avoided by the using the steering guidance, before the steering guidance is provided to the driver. Providing steering guidance in unsuitable situations may cause worsened accident scenarios. Thus in order to improve safety for the occupants of the vehicles, both the host vehicle and target vehicles, the steering guidance should only be provided when it is estimated that the driver will be able to avoid the collision. Other safety system may instead intervene if the steering guidance is not provided.

The present condition may be for example vehicle tire friction conditions, speed, distance to target, etc. For instance, if the vehicle tire friction is determined to be below a critical threshold, then the steering guidance may not be provided. Or, if the distance to the target under the present vehicle speed is too short, then the steering guidance may not be provided.

In embodiments, the method may include determining whether oncoming traffic is present in the opposite lane, wherein when no risk of colliding with oncoming traffic in the opposite lane caused by the indicated steering action can be concluded, providing the steering guidance. Accordingly, before the steering guidance is provided to the driver of the host vehicle, it is ensured that there is no traffic in the opposite lane which the host vehicle may risk colliding with if the host vehicle is driven into the opposite lane.

In embodiments, the method may include determining a stability parameter value indicative of the driving stability of the vehicle on the road, wherein the steering guidance is only provided when the stability parameter value indicates that the host vehicle is stable. The stability parameter may indicate a tire slip below a threshold value, preferably in the linear regime, i.e. that the vehicle is not "skidding". The slip angle is the angle between the travel direction of the tire contact patch and the wheel hub direction (i.e. the pointing direction of the wheel).

The steering guidance is maintained for a short time period being less than half the predetermined time to collision. In some possible implementations the steering guidance is maintained for about 10% of the predetermined time to collision, or about 20% of the predetermined time to collision, or about 30% of the predetermined time to collision.

In some embodiments, it may be included to determine a relative speed of the host vehicle relative the target, wherein the steering guidance is only provided when the relative speed exceeds a threshold where a collision with the target can not be avoided using an autobrake function of the host vehicle. Accordingly, if the autobrake function is sufficient to avoid the collision the steering guidance is not provided. In this way a hazardous situation which may appear when steering away and braking simultaneously is avoided.

In some embodiments, the method may include detecting a sideways movement of the target; providing a secondary steering guidance including altering a current steering wheel angular orientation in an opposite direction compared to the first steering guidance. Thus, in case the target moves sideways and the steering guidance is no longer needed, the secondary steering guidance is provided to guide the driver to steer back towards the original position of the host vehicle on the road.

According to a second aspect of the disclosure, there is provided a steering system for a host vehicle, the system includes: a driving environment detection unit configured to detect a target in the vicinity of the host vehicle; a road marker detection unit configured to detect a set of road markers on a side of the target; a drivable free space detection unit configured to detect a drivable free space on a side of the detected road markers opposite the target side of the road markers; a collision determining unit configured to determine that the host vehicle is on collision course with the target; a steering control unit configured to control a steering wheel angular orientation of a steering wheel of the host vehicle; and a vehicle control unit configured to: predict that a collision with the target is predicted to occur within a predetermined time period based on target data received from the driving environment detection unit and based on collision course data received from the collision determining unit; determine that no driver initiated steering action for avoiding the collision course has been detected; control the steering control unit to provide a steering guidance to the driver of the host vehicle by altering a steering wheel angular orientation from a current steering wheel angular orientation for momentarily steering the host vehicle towards the road markers to indicate an evasive steering action to the driver.

The various detection units included in the system may include at least one camera, a radar system, a LiDAR system, an ultrasonic system, etc.

In some embodiments the system may include a vehicle stability measuring unit configured to determine a stability parameter value indicative of the driving stability of the vehicle, wherein the vehicle control unit is configured to control the steering control unit to provide the steering guidance only when the stability parameter value indicates that the host vehicle is stable.

According to embodiments, the driving environment detection unit may be configured to determine a relative speed of the host vehicle relative the target, wherein the steering guidance is only provided when the relative speed exceeds a threshold where a collision with the target can not be avoided using an autobrake function of the host vehicle.

According to embodiments, when the driving environment detection unit detects a sideways movement of the target, the vehicle control unit may be configured to: receive information about the sideways motion, and provide a secondary steering guidance including altering a current steering wheel angular orientation in an opposite direction compared to the first steering guidance. In this way the host vehicle is returned to the original driving lane.

A control unit may include at least one microprocessor, microcontroller, programmable digital signal processor or another programmable device.

The steering control unit may control the alternation of the steering wheel orientation by controlling an actuator of e.g. a power steering system or a steer-by-wire system.

Effects and features of the second aspect of the disclosure are largely analogous to those described above in connection with the first aspect of the disclosure.

There is further provided a vehicle including the steering system according to any one of the embodiments.

In summary, the present disclosure relates to a method for assisting a driver of a host vehicle in avoiding a collision, the method including: detecting a target in the vicinity of the vehicle, determining that the host vehicle is travelling on a collision course with the target, and detecting a set of road markers on a side of the target. Moreover, detecting a free space on the side of the road markers opposite the target side of the road markers, and when a collision with the target is predicted to occur within a predetermined time period and no driver initiated steering action for avoiding the collision course has been detected, providing a steering guidance to the driver of the host vehicle including altering of a steering wheel angular orientation for momentarily steering the host vehicle towards the road markers to indicate an evasive steering action to the driver.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein.

DESCRIPTION OF EMBODIMENTS

Figure 1A:
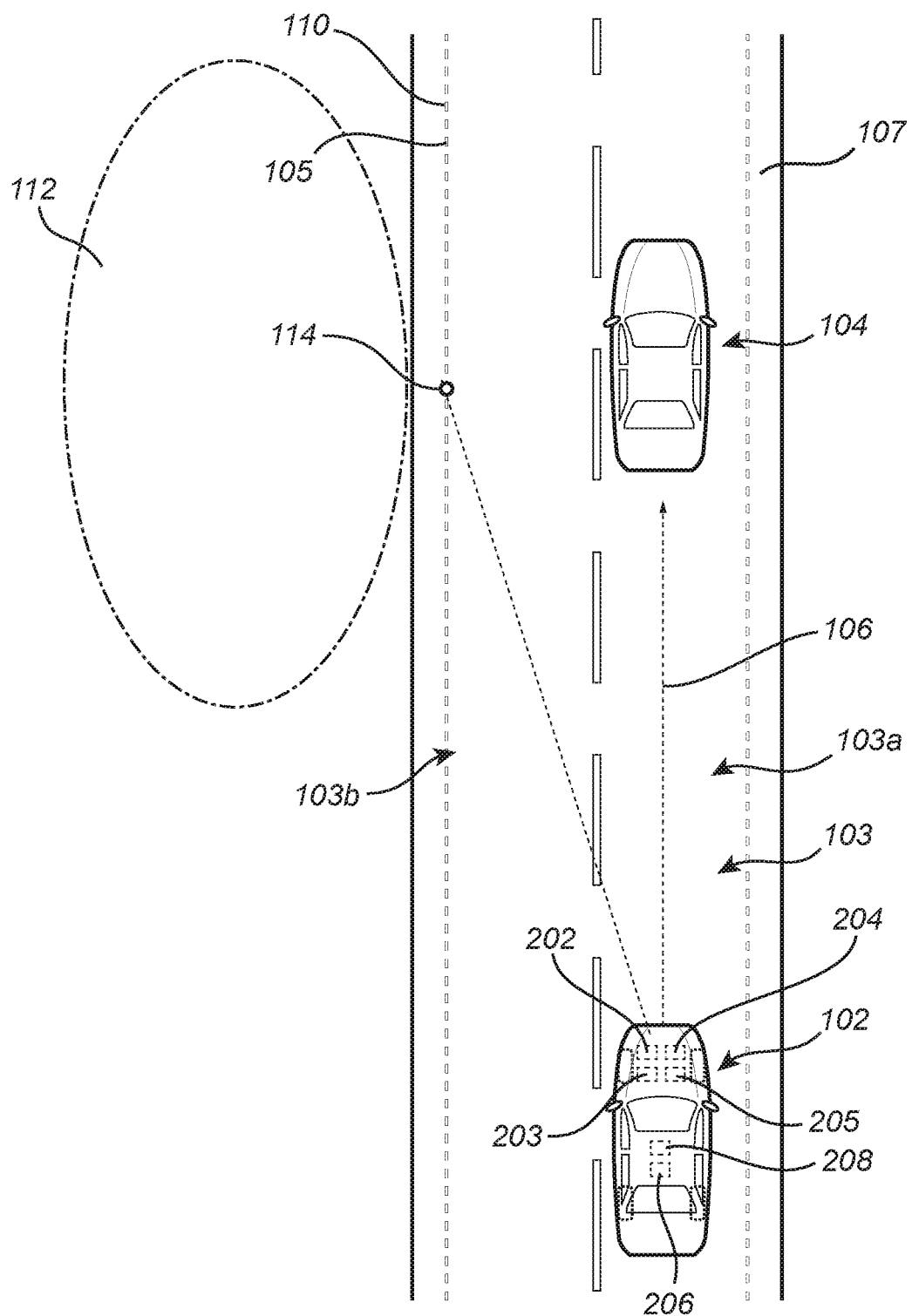
FIG. 1a illustrates a schematic overview of exemplifying a steering system according to embodiments of the disclosure.

In the present detailed description, various embodiments of the system and method according to the present disclosure are described. However, this disclosure may be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1a illustrates a schematic overview of exemplifying a steering system according to embodiments of the disclosure. The steering system is included in a host vehicle 102 here shown travelling on a road 103. The road is delimited by outer edges 105 and 107, which may be marked by lane markers. The road is here shown to have two lanes, the lane 103a on which the target 104 and the host vehicle 102 is travelling on and an opposing lane 103b.

The host vehicle 102 includes a driving environment detection unit 202 configured to detect a target 104 in the vicinity of the host vehicle 102. Furthermore, the host vehicle 102 includes a collision determining unit 204 configured to determine that the host vehicle 102 is on collision course with the target 104, and a steering control unit 206 configured to control a steering wheel angular orientation of a steering wheel of the host vehicle 102 and to control a steering control system for steering the vehicle 104. The host vehicle 102 further includes a road marker detection unit 203 configured to detect a set of road markers 110 on a side of the target 104, and a drivable free space detection unit 205 configured to detect a drivable free space 112 on a side of the detected road markers.

A vehicle control unit 208 of the host vehicle 102 is configured to execute a number of steps leading to an steering guidance signal to the steering control system to altering a steering wheel angular orientation from a current steering wheel angular orientation for momentarily steering the host vehicle towards the road markers at point 114 to indicate an evasive steering action to the driver, as will be described below.

The host vehicle 102 approaches the target 104 from a rear side of the target 104. Here, the target 104 is exemplified as a car for illustrative purposes. The target is however not limited to being a car but may be any vehicle or object which the host vehicle 102 may be on collision course with.

In the presently described situation, the host vehicle 102 is on collision course 106 with the target 104. The target may be detected by the driving environment detection unit 202 which may include a Lidar, a radar, a camera, ultrasound sensors, or any other suitable sensor that may detect objects in the vicinity of the host vehicle 102.

The collision determining unit 204 may use the information about the detected target 104, such as the location of the target 104 relative the host vehicle 102, and the present driving course of the host vehicle 102 to determine that the host vehicle 102 is on collision course 106 with the target 104.

As shown in FIG. 1a, if the host vehicle continues its present course 106, the risk of colliding with the target 104 is imminent.

The vehicle control unit 208 is configured to take action when a predicted time duration to a collision for the host vehicle 102 with the target 104 is below a threshold time, and no driver initiated steering action has been detected. In other words, the vehicle control unit 208 is configured to take action if a collision will occur within the predetermined time duration under the present speed and course 106. The predetermined time duration may be in the order of seconds, e.g. 1, 2, 3, 4, or 5 seconds.

Figure 1B:
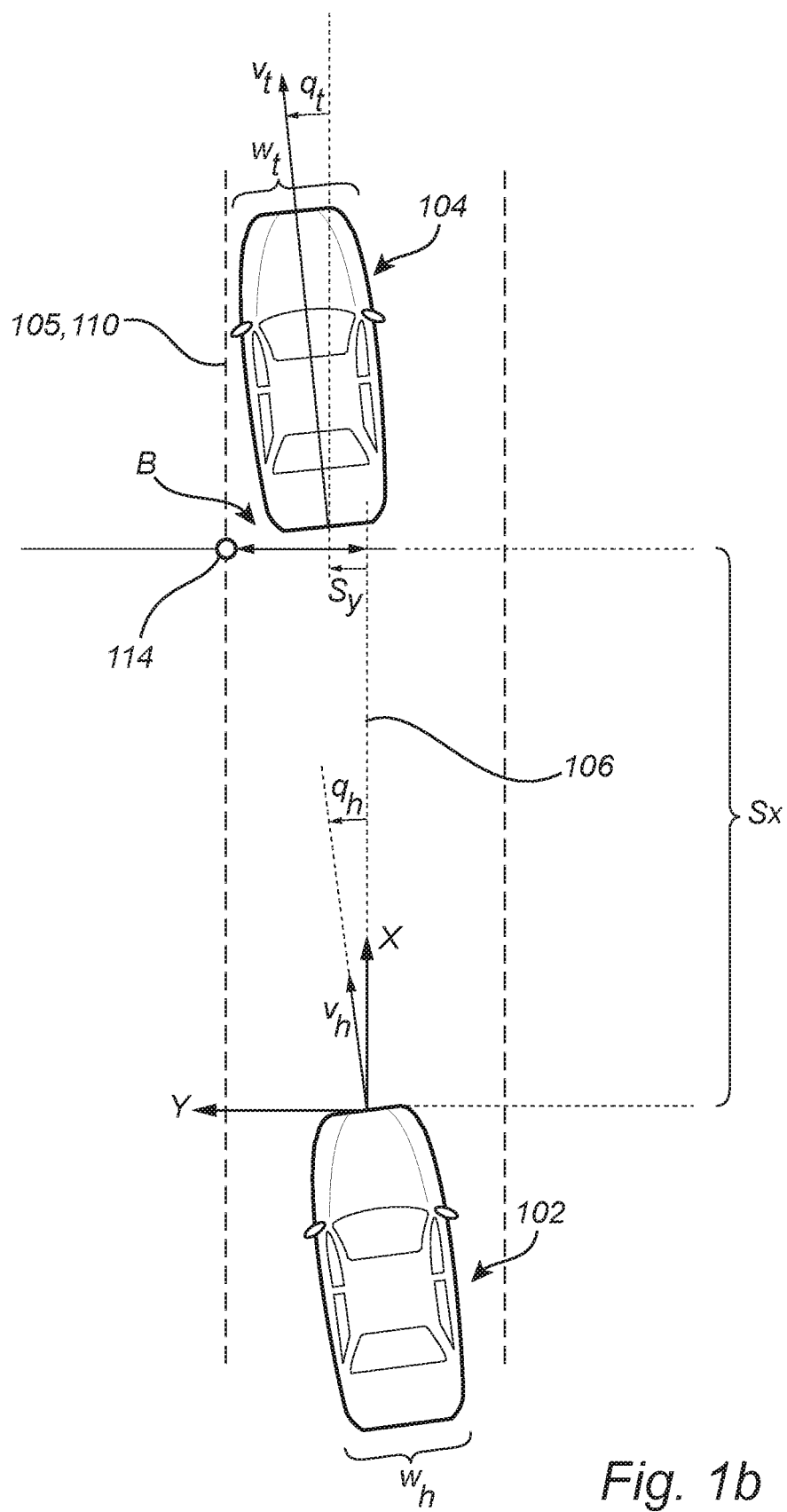
FIG. 1b illustrates a schematic overview of exemplifying a steering system according to embodiments of the disclosure.

FIG. 1b illustrates a host vehicle 102 approaching a target vehicle 104. The host vehicle 102 is travelling with speed $v_h$ and the target vehicle 104 is travelling with speed $v_t$. The yaw angle for the host vehicle 102 is $q_h$ and the yaw angle for the target vehicle 104 is $q_t$. For this example situation illustrated in FIG. 1b, there is a distance $S_x$ between the host vehicle 102 and the target vehicle 104 at time t=0.

The longitudinal position $X_h(t)$, and the lateral position $Y_h(t)$ for the host vehicle 102 may be calculated as:

$$X_h(t)=v_h*\cos(q_h)t, \text{ and } Y_h(t)=v_h*\sin(q_h)*t,$$

which may be estimated for small yaw angles to:

$$X_h(t)=v_h*t, \text{ and } Y_h(t)v_h*q_h*t.$$

For the target vehicle 104, the longitudinal position $X_t(t)$, and the lateral position $Y_t(t)$ are given by:

$$X_t(t)=S_x+v_t*\cos(q_t)*t, \text{ and } Y_t(t)=S_y+v_t*\sin(q_t)*t.$$

For small yaw angles:

$$X_t(t)=S_x+v_t*t, Y_t(t)=S_y+v_t*q_t*t.$$

If a collision occurs, it will be when $X_h(t)=X_t(t)$, which gives a time to collision $t_c=S_x/(v_h-v_t)$.

The lateral offset $Y_0$ between the host vehicle 102 and 104 at the time of collision $t_c$ is then given by:

$$Y_0=Y_h(t_c)-Y_t(t_c)=v_h*q_h*t_c-(S_y+v_t*q_t*t_c)=-S_y+(v_h*q_h-v_t*q_t)*t_c.$$

A collision may be predicted to occur if the lateral offset at the predicted time to collision is less than the average widths $w_h$, $w_t$ of the host 102 and target 104 vehicles. Accordingly, a collision may be predicted to occur if Abs $(Y_0)<(w_h+w_t)/2$. If $Y_0>(w_h+w_t)/2$ then host vehicle 102 will pass to the left of the target 104 without colliding.

If it is predicted that the host vehicle 102 will collide with the target vehicle 104 within a predetermined time period, then it is desirable to steer the host vehicle towards point 114 which may be part of a set of road markers. In other words, it is desirable to provide a steering guidance which alters the steering wheel angular orientation such that a yaw angle $q_h$ gives a total lateral displacement of B indicated in FIG. 1b. This means that the steering guidance should provide an additional yaw angle $q_{he}$ such that:

$$Y_h(t_c) = B \text{->} v_h*(q_h+q_{he})*t_c = B \text{->} q_{he} = B/(v_h*t_c) - q_h.$$

In this exemplary case, the steering guidance will provide a momentarily steering torque to the left of the target vehicle 104 and of the host vehicle 102 in case of a predicted collision, if there is free space 112 detected to the left of the point 114, i.e. to the left of the road markers 110 in FIG. 1a. The steering torque will not be applied to actually take the host vehicle to the road markers, i.e. to the side of the road, but will only be applied for a short time period such that the host vehicle 102 will point towards the point 114. The short time period may for example be about 20% of the time to collision.

Other example scenarios may be that the host vehicle is driving in an overtake lane and has detected space on the right hand side of a target vehicle 104 ahead of the host vehicle 102. In this case, the steering guidance will provide a momentarily steering torque to the right of the target vehicle 104 in case of a predicted collision, towards road markers to the right of the target vehicle. Thus, the point 114 will then be to the right of the target vehicle 104, towards road markers on the right hand side of the present overtake lane.

Applying the steering torque could for example be implemented by requesting a steering torque ($T_q$) via a PD (Proportional, Derivative) controller such as $T_q = K_p*e + K_d*(de/dt)$, where $e = (q_h+q_{he} - \text{yawAngleActual})$, and yawAngleActual may be calculated by integrating a yaw rate signal from a yaw rate sensor of the vehicle.

Furthermore, the steering guidance should only be provided if the vehicle can be determined to be stable. For this, a vehicle stability measuring unit is configured to determine a stability parameter value indicative of the driving stability of the host vehicle. The stability parameter value may relate to a side slip at the rear axle tires of the host vehicle. For instance, if the host vehicle is skidding, then no steering guidance should be provided.

In addition, in embodiments, a feasible lateral displacement for the host vehicle may be estimated. The feasible lateral displacement provides an estimate of the displacement that the driver is likely to safely achieve with the host vehicle 102. If feasible lateral displacement exceeds the lateral displacement B, then the steering guidance is provided. The feasible lateral displacement may be given by $\Delta Y = 0.5*9.81*(t_c)^2$, thus the steering guidance is provided if $\Delta Y > B$.

Figure 2:
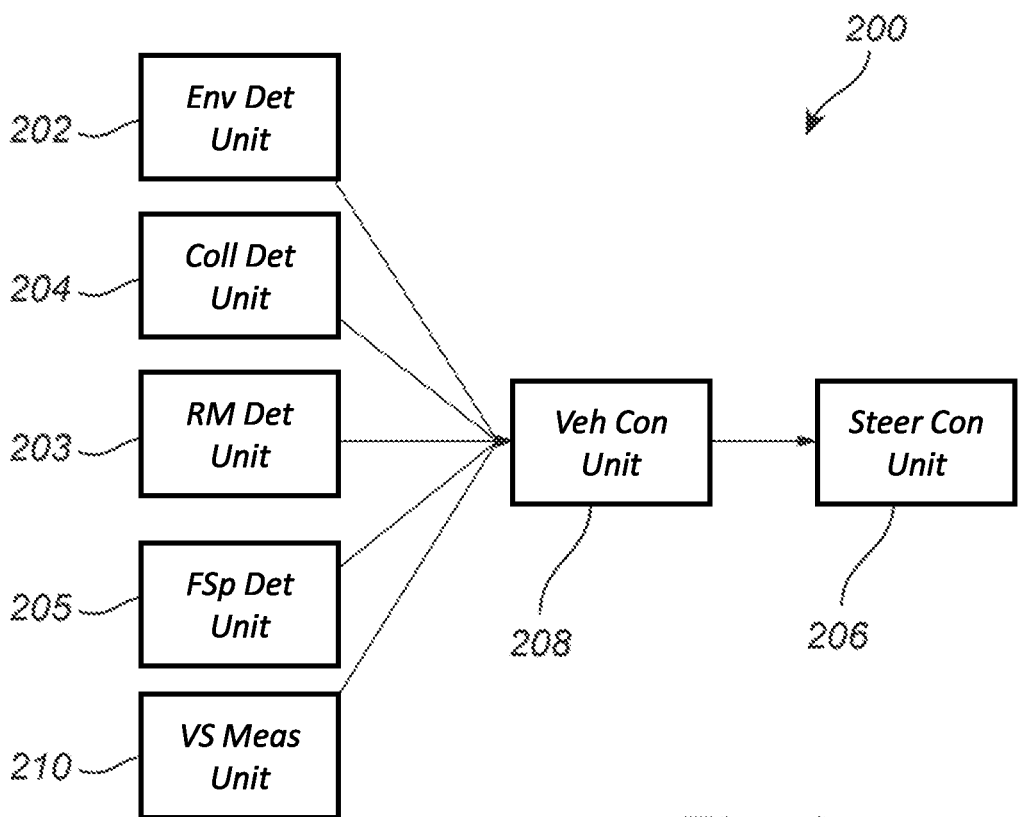
FIG. 2 is a box diagram of a steering system according to embodiments of the disclosure.

FIG. 2 is a box diagram of a steering system 200 according to embodiments of the disclosure. The steering system 200 includes a driving environment detection unit 202 configured to detect a target in the vicinity of the host vehicle. The driving environment detection unit 202 may include a Lidar, radar, a camera, ultrasound sensors, or any other suitable sensor that may detect objects in the vicinity of the host vehicle. The driving environment detection unit 202 may provide a signal indicative of detected objects to a vehicle control unit 208.

Moreover, the system 200 includes a collision determining unit 204 configured to determine that the host vehicle is on collision course with the target. The collision determining unit 204 may include a processor or control unit, for example part of the vehicle control unit 208 or part of a another safety system of the vehicle used for predicting collision. The collision determining unit 204 may provide a signal to the vehicle control unit that the host vehicle is on collision course with a target.

A steering control system 206 included in the system 200 is configured to control a steering wheel to provide a steering torque of the host vehicle. The steering toque is used for turning the steerable wheels of the vehicle to a desirable wheel angle. The steering control system 206 is controlled by the vehicle control unit 208.

There is further a road marker detection unit 203 configured to detect a set of road markers on a side of the target. The road marker detection unit 203 may include a Lidar, radar, a camera, ultrasound sensors, or any other suitable sensor that may detect road markers.

A drivable free space detection unit 205 of the system 200 is configured to detect a drivable free space on a side of the detected road markers. The drivable free space detection unit 205 may include a Lidar, radar, a camera, ultrasound sensors, or any other suitable sensor that may detect a drivable free space. In addition, the drivable free space detection unit 205 may include vehicle to vehicle communication units, and/or vehicle to infrastructure communication units, and/or vehicle to device communication units, i.e. communication units generally known as V2X communication with the "cloud" via a server in order to gain information of the presence of other vehicles or objects.

In some embodiments, the evasive steering system 200 includes a vehicle stability measuring unit 210 configured to determine a stability parameter value indicative of the driving stability of the vehicle. The vehicle control unit 208 is configured to provide the steering guidance only when the host vehicle is determined to be stable.

Figure 3:
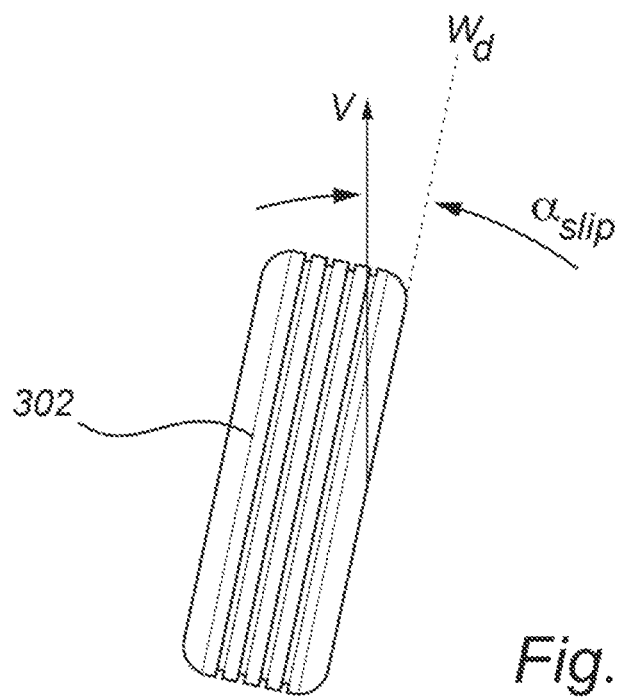
FIG. 3 schematically illustrates a slip angle.

The stability parameter may be indicative of a slip angle for at least one wheel of the host vehicle. FIG. 3 schematically illustrates a top view of a vehicle tire 302. The slip angle ($\alpha_{slip}$) is defined as the angle between the travel direction v of the tire contact patch and the wheel hub direction $W_d$ (i.e. the pointing direction of the wheel). For example, it is desirable that the host vehicle is not under a skidding event when the intervening action is initiated. Measuring the slip angle may be performed by means known per se in the art.

Furthermore, the longitudinal slip of a host vehicle wheel may also be used as an indication of vehicle stability. A large longitudinal slip indicates that the host vehicle is under intensive braking or acceleration which is not a stable situation for the host vehicle.

Figure 4:
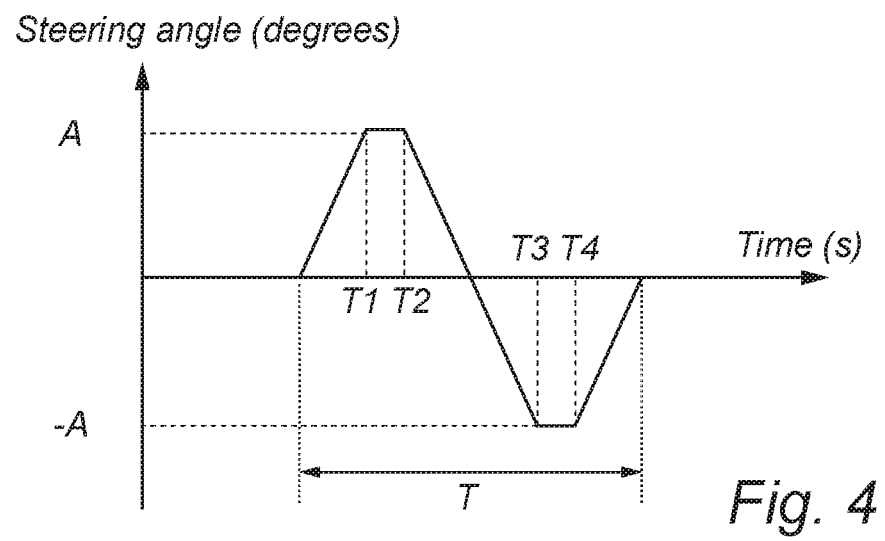
FIG. 4 is a graph illustrating an exemplary steering angle profile used for a steering guidance in embodiments of the disclosure.

FIG. 4 illustrates an exemplary steering angle profile which may be used as a steering guidance. The profile includes an increase of the steering angle until it reaches maximum amplitude A after a time T1. The steering angle A is maintained for a time period being the difference T1 and T2 in order to obtain the desired yaw angle for the vehicle. At time T2, a steering angle change is initiated, and at a later time T3, the same opposite steering angle amplitude is reached. Accordingly, the vehicle is steering in the opposite direction with the same amplitude on the steering angle. It should be noted that the steering angle profile is symmetric about half the time duration T.

With the described steering angle profile, the vehicle is first steered towards the road marker, at time T2, the steering angle is reversed, whereby the vehicle is steered back to the initial position during the second half of the time duration T.

Figure 5:
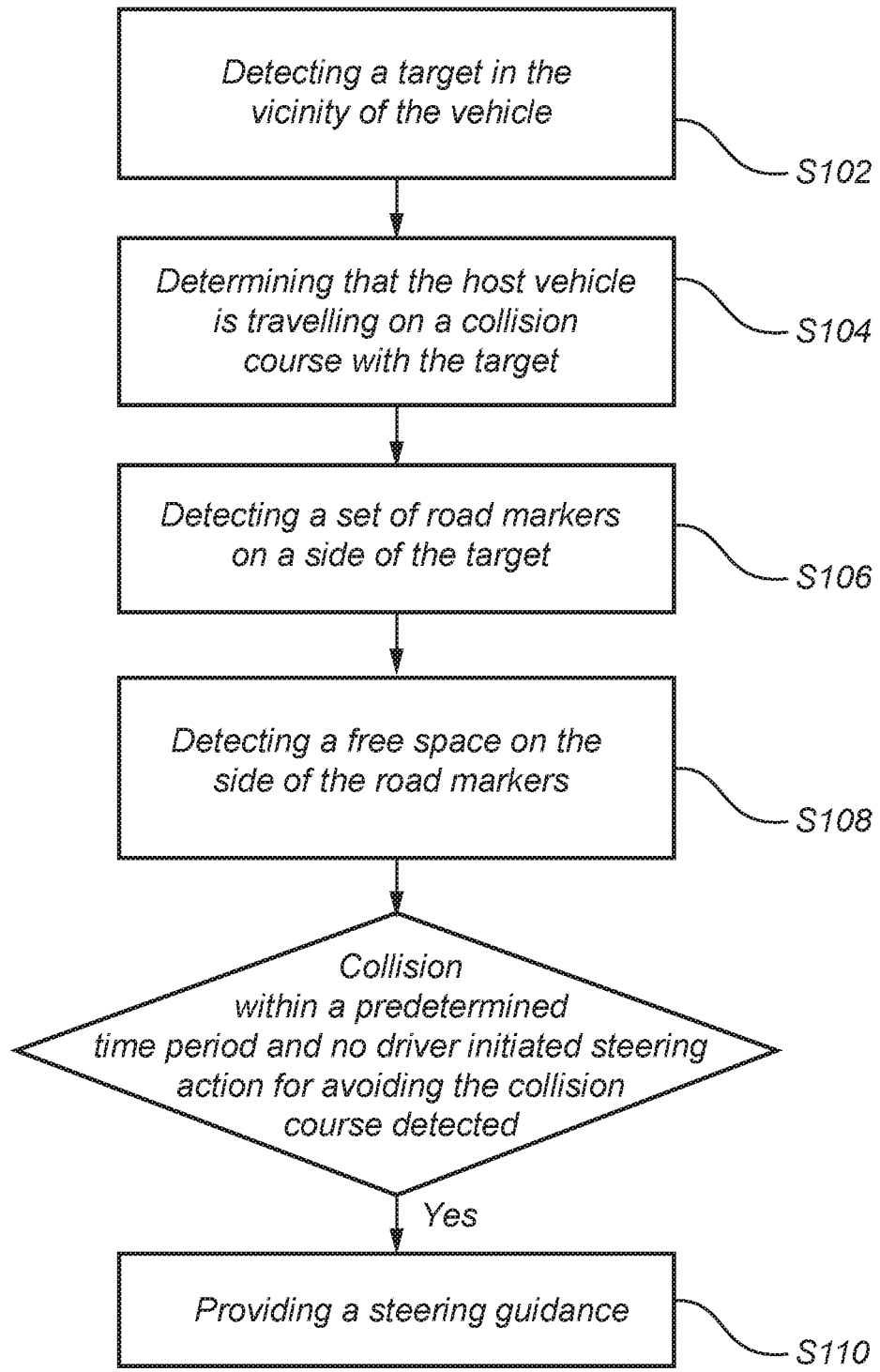
FIG. 5 is a flow-chart of method steps according to embodiments of the disclosure.

FIG. 5 is a flow chart of method steps according to embodiments of the disclosure. In a step S102 detecting a target in the vicinity of the vehicle. In step S104, determining that the host vehicle is travelling on a collision course with the target. In step S106 detecting a set of road markers on a side of the target. In step S108 detecting a free space on the side of the road markers opposite the target side of the road markers. When a collision with the target is predicted to occur within a predetermined time period and no driver initiated steering action for avoiding the collision course has been detected, providing in step S110 a steering guidance to the driver of the host vehicle. The steering guidance includes to alter a steering wheel angular orientation from a current steering wheel angular orientation for momentarily steering the host vehicle towards the road markers to indicate an evasive steering action to the driver.

A vehicle (host or target) in accordance with the disclosure may be any vehicle operative on a road, such as a car, a truck, a lorry, a bus, etc.

The vehicle control unit or other control units described herein may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for assisting a driver of a host vehicle in avoiding a collision with a target, the method comprising:
   detecting a target in the vicinity of the vehicle;
   determining that the host vehicle is travelling on a collision course with the target;
   detecting a road marker on a side of the target;
   detecting a free space on the side of the road marker opposite the target side of the road marker;
   when a collision with the target is predicted to occur within a predetermined time period and no driver initiated steering action for avoiding the collision course has been detected, providing a steering guidance to the driver of the host vehicle, the steering guidance comprising altering of a steering wheel angular orientation from a current steering wheel angular orientation for momentarily steering the host vehicle towards the road marker to indicate an evasive steering action to the driver;
   determining a lateral displacement (B) required for the host vehicle to avoid a collision with the target; and
   estimating a feasible lateral displacement for the host vehicle under present conditions before the impending collision occurs, wherein
   when the feasible lateral displacement exceeds the required lateral displacement, providing the steering guidance.

2. The method of claim 1, wherein the steering guidance is overridable by the driver of the host vehicle by providing input via the steering wheel.

3. The method of claim 1, comprising:
   determining whether oncoming traffic is present in an adjacent lane, wherein when no risk of colliding with oncoming traffic in the adjacent lane caused by the indicated steering action can be concluded, providing the steering guidance.

4. The method of claim 1, comprising:
   determining a stability parameter value indicative of the driving stability of the vehicle on the road, wherein the steering guidance is only provided when the stability parameter value indicates that the host vehicle is stable.

5. The method of claim 1, wherein the steering guidance is maintained for a short time period being less than half the predetermined time to collision.

6. The method of claim 1, comprising:
   determining a relative speed of the host vehicle relative the target, wherein the steering guidance is only provided when the relative speed exceeds a threshold where a collision with the target can not be avoided using an autobrake function of the host vehicle.

7. The method of claim 1, comprising:
   detecting a sideways movement of the target;
   providing a secondary steering guidance comprising altering a current steering wheel angular orientation in an opposite direction compared to the first steering guidance to steer the host vehicle back towards the original lane position.

8. A steering system for a host vehicle, the system comprising:
   a driving environment detection unit configured to detect a target in the vicinity of the host vehicle;
   a road marker detection unit configured to detect road marker on a side of the target;
   a drivable free space detection unit configured to detect a drivable free space on a side of the detected road marker opposite the target side of the road marker;
   a collision determining unit configured to determine that the host vehicle is on collision course with the target;
   a steering control unit configured to control a steering wheel angular orientation of a steering wheel of the host vehicle; and
   a vehicle control unit configured to:
      predict that a collision with the target is predicted to occur within a predetermined time period based on target data received from the driving environment detection unit and on collision course data received from the collision determining unit;
      determine that no driver initiated steering action for avoiding the collision course has been detected;
      control the steering control unit to provide a steering guidance to the driver of the host vehicle by altering a steering wheel angular orientation from a current steering wheel angular orientation for momentarily steering the host vehicle towards the road marker to indicate an evasive steering action to the driver;
      determine a lateral displacement (B) required for the host vehicle to avoid a collision with the target; and
      estimate a feasible lateral displacement for the host vehicle under present conditions before the impending collision occurs, wherein
      when the feasible lateral displacement exceeds the required lateral displacement, providing the steering guidance.

9. A vehicle comprising the steering system of claim 8.

10. The steering system of claim 8, comprising:
   a vehicle stability measuring unit configured to determine a stability parameter value indicative of the driving stability of the vehicle, wherein the vehicle control unit is configured to the steering control unit to provide the steering guidance only when the stability parameter value indicates that the host vehicle is stable.

11. The steering system of claim 8, wherein the driving environment detection unit is configured to determine a relative speed of the host vehicle relative the target, wherein the steering guidance is only provided when the relative speed exceeds a threshold where a collision with the target can not be avoided using an autobrake function of the host vehicle.

12. The steering system of claim 8, wherein when the driving environment detection unit detects a sideways movement of the target, the vehicle control unit is configured to:
   receive information about the sideways motion, and
   provide a secondary steering guidance comprising altering a current steering wheel angular orientation in an opposite direction compared to the first steering guidance.

13. The steering system of claim 8, wherein the steering guidance is overridable by the driver of the host vehicle by providing input via the steering wheel.

\* \* \* \* \*